United States Patent [19]
Breternitz, Jr.

[11] Patent Number: 5,966,143
[45] Date of Patent: Oct. 12, 1999

[54] DATA ALLOCATION INTO MULTIPLE MEMORIES FOR CONCURRENT ACCESS

[75] Inventor: Mauricio Breternitz, Jr., Austin, Tex.

[73] Assignee: Motorola, Inc., Schaumburg, Ill.

[21] Appl. No.: 08/949,356

[22] Filed: Oct. 14, 1997

[51] Int. Cl.$^6$ ........................................... G06F 9/45
[52] U.S. Cl. ..................... 345/709; 711/150; 711/168; 712/35
[58] Field of Search ........................... 395/709; 711/150, 711/168; 712/35

[56] References Cited

U.S. PATENT DOCUMENTS

| | | | |
|---|---|---|---|
| 4,571,678 | 2/1986 | Chaitin ..................................... | 395/709 |
| 5,249,295 | 9/1993 | Briggs et al. ........................... | 395/709 |
| 5,418,958 | 5/1995 | Goebel .................................... | 395/709 |
| 5,774,730 | 6/1998 | Aizikowitz et al. .................... | 395/709 |

OTHER PUBLICATIONS

Briggs–Cooper–Torczon, "Improvements to Graph Coloring Register Allocation," ACM Transactions on Programming Languages and Systems, vol. 16, No. 3, pp. 428–455, May 1994.

Mauricio Breternitz, Jr & John Paul Shen, Implementation Optimization Techniques for Architecture Synthesis of Application–Specific Processors, ACM, Nov. 1991.

Mazen A.R. Saghir, et al., "Automatic Data Partitioning for HLL DSP Compilers", Dept. of Electrical and Computer Engineering, University of Toronto, Canada, pp. 1–6.

Ashok Sudarsanam, et al., "Memory Bank and Register Allocation in Software Synthesis for ASIPs", Department of Electrical Engineering, Princeton University, 5 pgs.

Mauricio Breternitz, et al., "Implementation Optimization Techniques for Architecture Synthesis of Application–Specific Processors", 1991 ACM 0–89791–460–091/0011/0114, pp. 114–123.

*Primary Examiner*—Robert W. Downs
*Assistant Examiner*—Antony Nguyen-Ba
*Attorney, Agent, or Firm*—Bruce Hayden; Jeffrey G. Toler

[57] ABSTRACT

Data is allocated into multiple memories with selective variable replication for maximizing performance by minimizing concurrent memory access conflicts. Requirements for concurrent access are summarized in a transformed concurrent access graph. Graph vertices are merged to disallow variable replication. All potential graph merges that cause a reduction in machine cycle time are identified. The ratios of saved cycles/memory cost in bytes are then computed for each potential merge. The potential merges are then sorted by their saved cycles/bytes ratio. Finally, potential merges resulting in replicated variables are selected based on their cycles/bytes ratios until a predefined memory target size is achieved. Either graph coloring or clique partitioning can be used to allocate variables into memory banks.

30 Claims, 6 Drawing Sheets

```
I 82:  STORE A
       GOTO K 86
       ...
J 84:  STORE A:
       GOTO K 86
       ...
K 86:  LOAD A
```

*FIG.8*

```
I 92:  STORE a
       ...
J 94:  LOAD a
       ...
K 96:  LOAD a
```

DATA ALLOCATION INTO MULTIPLE MEMORIES FOR CONCURRENT ACCESS

FIELD OF THE INVENTION

The present invention generally relates to compilers, and more specifically to allocating data over multiple memories for concurrent memory accesses.

BACKGROUND OF THE INVENTION

Programmable digital signal processors (DSPs) often use multiple data memory banks to facilitate the exploitation of parallelism in accessing operands from memory. To utilize this capability, however, the data must be properly partitioned and distributed among different memory banks.

To illustrate the importance of data partitioning on execution performance, consider an $N^{th}$ order FIR (finite impulse response) filter algorithm executed by a hypothetical DSP similar to the Motorola DSP560001. This hypothetical DSP has two data-memory banks that can each be accessed once every clock cycle. But to fetch the elements of arrays A (the data) and B (the filter coefficients) in parallel, the arrays must be stored in separate memory banks. Conversely, if the arrays are stored in the same memory bank, the elements of the arrays would have to be fetched sequentially, and the execution of the code would be slowed down. The ability to access multiple memory banks in parallel with other operations is fundamental to most DSPs. However, failure to properly distribute the data among the memory banks can limit the exploitation of such parallelism and can therefore degrade execution performance.

Data partitioning is currently performed manually by the programmer, who must typically resort to the use of assembler directives or compiler pragmas to control the partitioning of data in a program. As programs become larger and more sophisticated, it becomes very difficult to partition data manually and to ensure that the partitioning results in optimal execution performance. Automatic data partitioning is therefore becoming a necessity, especially with the current trend towards a heavier reliance on high-level languages to program DSPs. Automatic data partitioning relieves the programmer from this task and helps improve performance across an entire program.

BRIEF DESCRIPTION OF THE DRAWINGS

The features and advantages of the present invention will be more clearly understood from the following detailed description taken in conjunction with the accompanying FIGS. where like numerals refer to like and corresponding parts and in which.

DETAILED DESCRIPTION

Figure 1:
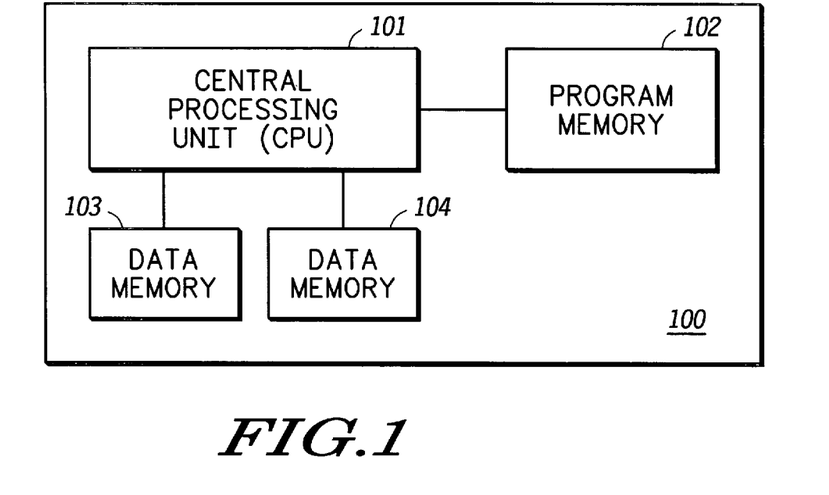
FIG. 1 is a block diagram of a Digital Signal Processor (DSP) with dual memory banks.

FIG. 1 is a block diagram of a Digital Signal Processor (DSP) with dual memory banks. The DSP 100 contains a central processing unit (CPU) 101 coupled to program memory 102 that supplies instructions to the CPU 101, and two data memory banks 103, 104. Digital Signal Processors (DSPs) 100 commonly use dual data memory banks to double the memory system's bandwidth. This increases effective memory bandwidth by allowing multiple simultaneous accesses to distinct memory banks. Programmers must assign concurrently-accessed global variables and arrays to different memory banks to achieve performance. Making effective use of dual memory banks is a difficult task, especially for high level language compilers.

This invention presents a method to perform that task automatically. This method allocates data into multiple memory banks such that concurrent access can be made. This method also automatically selects variables for duplication, enhancing concurrent access opportunities with minimal impact on cost.

Replication is a technique to enhance concurrent access opportunities. Suppose arrays A and B are concurrently accessed in one instruction, array B and C are accessed concurrently in a second instruction and arrays A and C are accessed concurrently in a third instruction. In order to satisfy all three concurrent-access requirements, three memory banks are necessary. However, if one has duplicate copies of one of the arrays, e.g., array A, then all three array accesses may be performed. However, duplication must be made carefully to avoid excessive memory size costs and to avoid overheads for maintaining coherence between multiple copies of the array.

Figure 2:
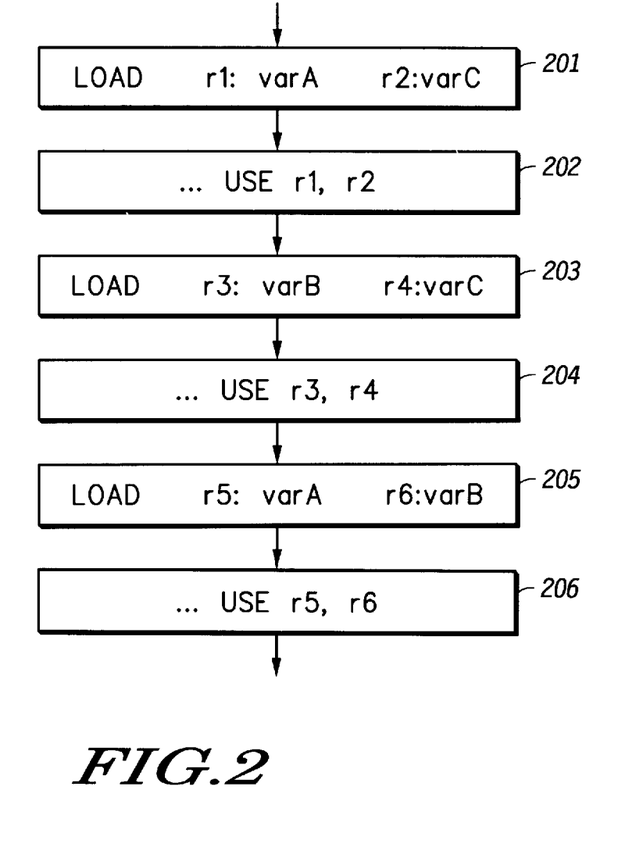
FIG. 2 is an example program that uses multiple concurrent data accesses.
Figure 3:
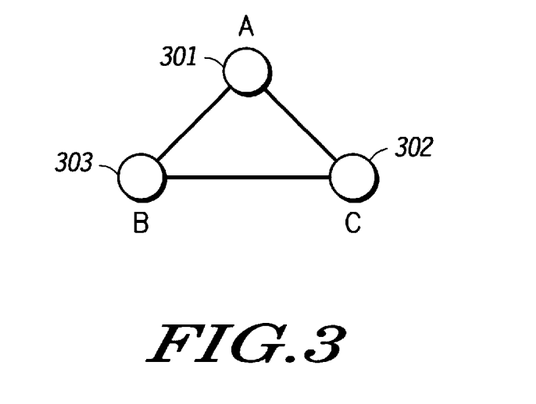
FIG. 3 is a graph that illustrates the concurrent access relationships in the example program shown in FIG. 2.
Figure 4:
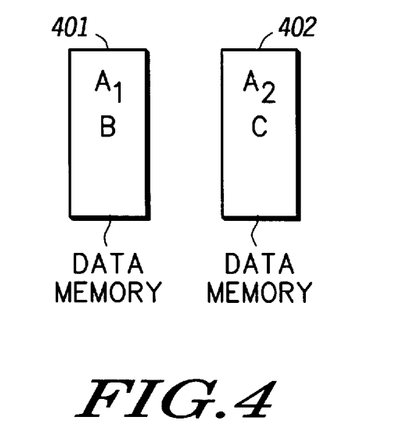
FIG. 4 is a block diagram that illustrates allocation of array variables into dual memory banks with replication of one of the variables.

FIGS. 2, 3 and 4 illustrate this example. FIG. 2 is an example program that uses multiple concurrent data accesses. FIG. 3 is a graph that illustrates the concurrent access relationships in the example program shown in FIG. 2. FIG. 4 is a block diagram that illustrates allocation of array variables into dual memory banks with replication of one of the variables. In FIG. 4, copies of variable A ($A_1$ and $A_2$) are stored in both memory banks 401, 402.

The algorithm allocates variables into one of the memory banks. Because memory banks are single-ported, variables that are accessed concurrently, either for reading or writing, by some instruction cannot be allocated in the same memory bank. The requirements for concurrent memory access are generated by the compiler assuming multi-ported memory banks. The goal of the algorithm is to satisfy those access requirements. In case conflict-free allocation is not possible, even after replication, the schedule is altered to perform the memory accesses sequentially instead of concurrently, thus impacting performance.

An instruction "x:=y+z" is a definition of variable "x" and a use of variables "y" and "z." If there is a possible execution path in the program such that the value of variable "x" defined at instruction M1 may be used as an operand for some operation in instruction M2 the definition of "x" in M1 is said to reach M2.

Figure 5:
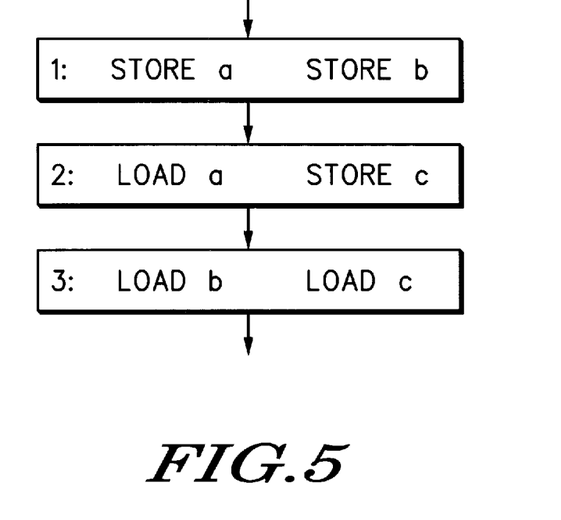
FIG. 5 is a block diagram of a example program for illustrating a concurrent access graph.
Figure 6:
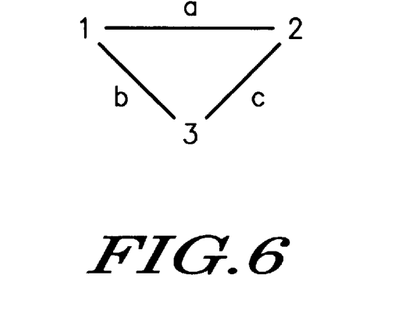
FIG. 6 is a concurrent access graph for the example program shown in FIG. 5.

FIG. 5 is a block diagram of a example program for illustrating a concurrent access graph. This is a graph that captures all the relationships of concurrent access of the variables in the program. FIG. 6 is a concurrent access graph for the example program shown in FIG. 5. FIG. 5 illustrates definitions and uses. Instruction 1 (501) defines a value for variable a that reaches Instruction 2 (502). In the concurrent access graph (500) this is indicated by an edge labeled "a" between nodes labeled 1 and 2. Similarly, Instruction 1 (501) also defines a value for variable "b" that reaches Instruction 3 (503). Again, in the concurrent access graph (FIG. 6) this is indicated by an edge labeled "b" between nodes labeled 1 and 3.

The example of FIG. 5 indicates a situation where replication is needed to ensure concurrent access. It this example, one notices that replication of variable "c" would allow for the required concurrent accesses. In this example, extra memory positions (to store the two copies of variable "c") are used to avoid lengthening the schedule and performing the memory accesses sequentially.

The key idea is to operate on a concurrent access graph that represents concurrent-access constraints. A graph-coloring algorithm is applied to the modified graph (This is similar to the graph-coloring representation of access constraints used in optimizing compilers).

A graph G(V,E) having a set of vertices V corresponding to the instructions in the program and edges E between those instructions is constructed. For each "store" of a variable X (array or global variable) in the program, we construct edges labeled X between the instruction containing the STORE and all instructions that contain LOADs of X reached by the STORE. (In compiler terminology, we add an edge between each DEFINITION of variable X and all possible USEs of X).

Graph G summarizes the requirements for concurrent access: whenever two edges with distinct labels (variable names) share a vertex, it indicates that the corresponding variables must be allocated into different memory banks to allow concurrent access.

A concurrent access graph G (FIG. 6) is constructed having a vertex for each instruction Mi in the program. If there is a possible execution path in the program such that variable "v" defined at instruction M1 is used as an operand for some operation in instruction M2, Graph G has an edge labeled "v" between vertex M1 and vertex M2.

The relationship of concurrent-access to variables in memory banks is captured in Graph G by edges that share vertices: if variables "x" and "y" are concurrently accessed by some instruction M, then Graph G has two edges labeled "x" and "y" emanating from the vertex labeled M.

Figure 7:
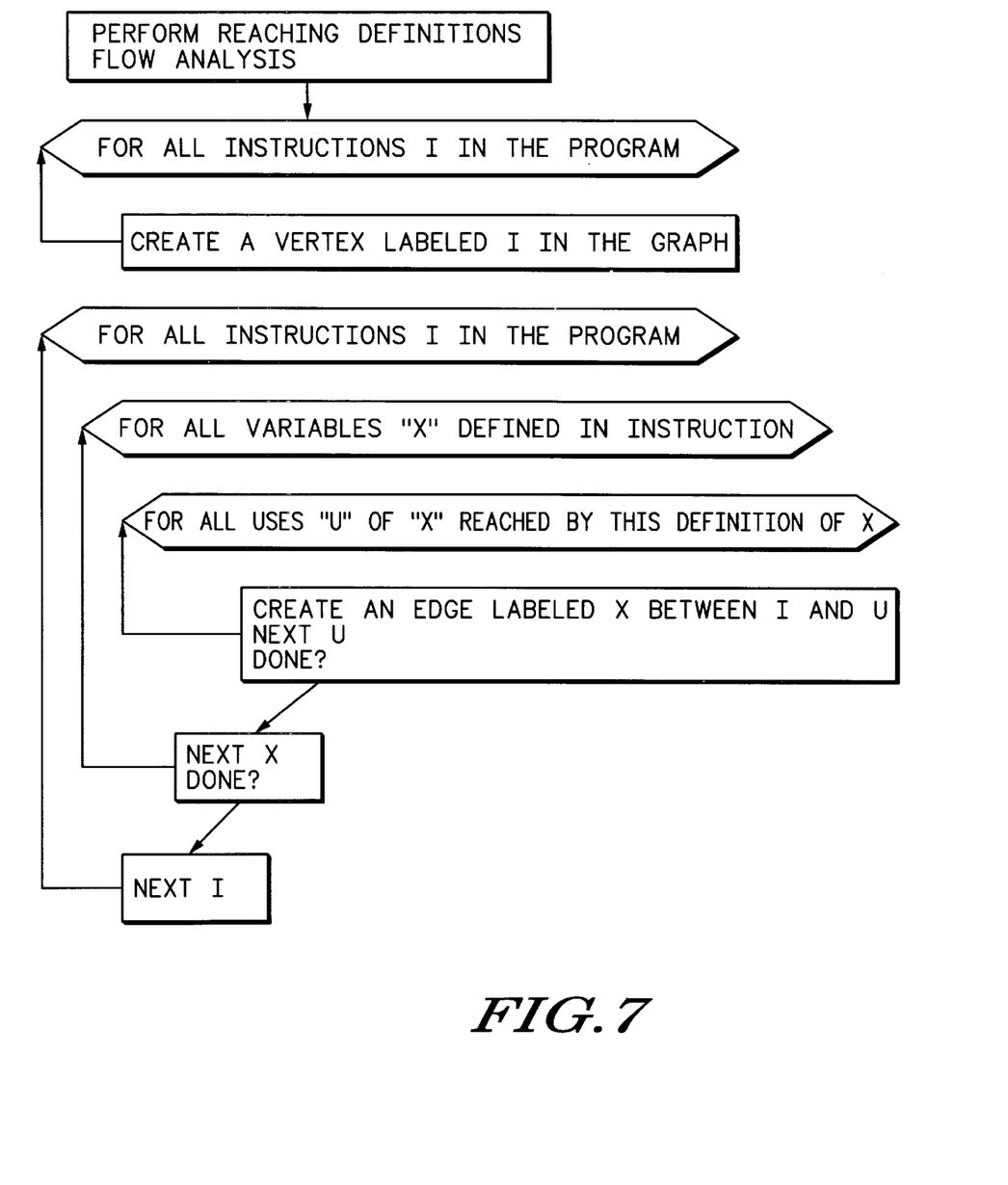
FIG. 7 is a flowchart illustrating construction of a concurrent access graph.

To construct graph G, "reaching definitions" flow analysis is performed (FIG. 7). A definition of variable "v" in instruction M that reaches instruction N creates in Graph G an edge labeled "v" between the vertex labeled N and the vertex labeled M.

Because graph G summarizes the requirements for concurrent access, it seems that applying edge coloring to graph G could be used to assign variables into memory banks. However, the edge-coloring method has two important drawbacks shown below.

Edge coloring of a graph is an assignment of colors to the edges in the graph such that no two edges which have a common vertex are assigned the same color. Each color corresponds to a memory bank. If two variables "X" and "Y" share a vertex in graph G, they are assigned distinct colors and thus located in distinct memory banks. Thus, variables that are concurrently LOADed or STOREd in the same instruction receive different colors by an edge coloring algorithm. Therefore, an allocation created via edge-coloring satisfies the single-ported memory bank constraints, allowing concurrent access from multiple single-ported memory banks as required by the program, provided that the number of colors used is less than or equal to the number of memory banks. If there are more colors than memory banks, this means that the concurrent access requirements cannot be satisfied and the program schedule must be changed by performing some of the accesses sequentially.

Figure 9:
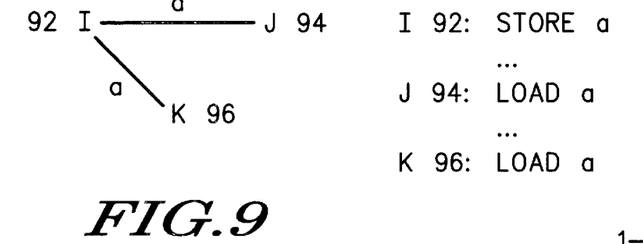
FIG. 9 is an example program and its associated concurrent access graph illustrating a problem with a variable definition reaching two uses of that variable.

However, naive application of edge coloring, as described, creates a problem. FIG. 9 is an example program and its associated concurrent access graph illustrating a problem with a variable definition reaching two uses of that variable. Suppose a STORE in instruction "I" 92 reaches two LOADs in instructions "J" 94 and "K" 96, respectively. According to the above, the two corresponding edges would be allocated distinct colors, thus implying in un-necessary replication of the variable.

Figure 8:
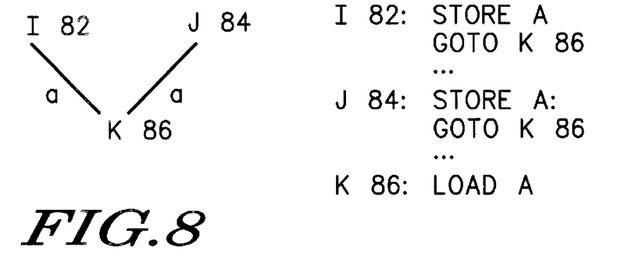
FIG. 8 is an example program and its associated concurrent access graph illustrating a problem with a variable use reached by two definitions.

A similar problem happens when a use of a variable is reached by multiple definitions. FIG. 8 is an example program and its associated concurrent access graph illustrating a problem with a variable use reached by two definitions. There would be an edge from each definition to the use, and each edge would be assigned distinct colors thus generating unnecessary copies. This makes simple edge-coloring method as presented above only applicable for the case of straight line programs. For example, assume that distinct branches of an if-then-else statement assign new values to variable a and the variable is later used at the rejoin. In FIG. 8, the "then" side (Instruction labeled I 82) creates a value for "A" and the "else" since (Instruction labeled J 84) creates a different value. In the simple edge-coloring method, each pair {definition, use} of "A" generates an edge in Graph G. Because the edges share the vertex labeled I 82, the corresponding variables are allocated into two distinct memory banks. Consequently, the definition of "A" in Instruction I 82 is stored in one memory bank, and the definition of "A" in Instruction J 84 side is written into another memory bank. When program execution reaches the use of "A" at the rejoin point (Instruction K 86) it is not known which memory bank holds the proper value of variable "A", since it depends on past history of the execution of the program.

Figure 10:
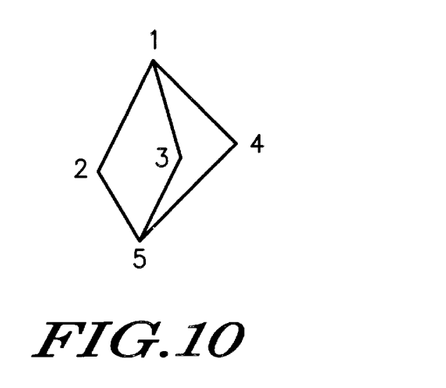
FIG. 10 is a sample concurrent access graph.
Figure 11:
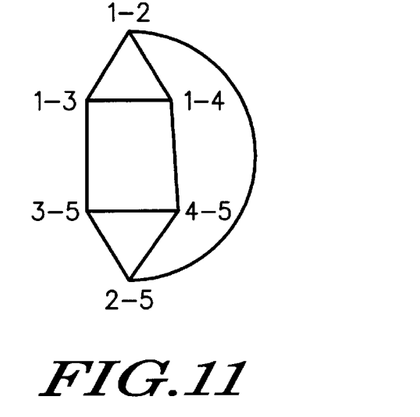
FIG. 11 is a line graph of the sample concurrent access graph shown in FIG. 10.
Figure 12:
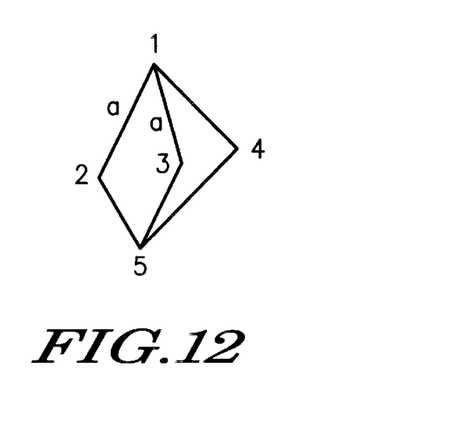
FIG. 12 is a concurrent access graph in which a single variable definition reaches two uses of that single variable.
Figure 13:
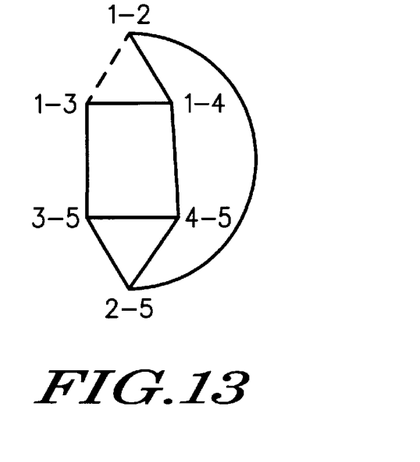
FIG. 13 is a line graph the concurrent access graph shown in FIG. 12 altered by removal of an edge.

To solve these problems, we operate on the LINE GRAPH of G. FIG. 10 is an example concurrent access graph G. FIG. 11 is a line graph L(G) of the example concurrent access graph G shown in FIG. 10. The line graph L(G) of a graph G is a graph which has a vertex corresponding to each edge of G. Vertices of L(G) are connected if and only if the corresponding edges of G share a vertex. Vertex-coloring of L(G) corresponds to Edge-coloring of G. (Vertex coloring of a graph G is an assignment of colors to vertices such that no adjacent vertices receive the same color). As before, note that different colors correspond to different memories. Before Vertex Coloring is applied, L(G) is transformed in two ways:

1. Edges between vertices corresponding to a definition of a variable reaching multiple uses are removed. FIG. 12 is a concurrent access graph G' in which a single variable definition reaches two uses of that single variable. FIG. 13 is a line graph L(G') of the concurrent access graph shown in FIG. 12 altered by removal of an edge. This edge removal allows the possibility of all uses of the definition receiving the same color (which implies the variable is stored in one memory bank). However, it is still possible to have distinct colors for each use, which means that the variable might be duplicated, if necessary, to allow concurrent access; and 2. Edges between vertices corresponding to multiple definitions of a variable reaching one use are removed.

Note that, after steps (1) and (2) above, L(G') is 2-colorable.

The Method proceeds by merging those vertices in L(G') that correspond to the same variable. It works in two kinds of vertices:

1. merging vertices corresponding to multiple definitions of a variable that reach the same use (those are edges previously removed in step 1 above); and 2. merging vertices labeled with the same variable name.

The merge is performed as long as 2-colorability is maintained.

Avoiding a merge may imply duplicating that variable, if distinct edges labeled with that variable name receive different colors, i.e., are assigned to different memory banks.

The cost of a potential merge has two components: cycle cost and bytes. "Cycle cost" refers to program schedule impact of a potential merge. If a variable is replicated, all definitions (STOREs) of that variable must write to all copies of the variable in the memory banks. This may take multiple cycles if the memory ports are otherwise occupied. Similarly, the "bytes" component of the cost refers to the extra memory space required to store the variable in case it is replicated. For dual memory systems, the cycle cost of a merge is defined as −1 if all definitions of the variable are found in instructions that have N−1 other memory accesses, where N is the number of memory accesses that can be made concurrently. For dual memory systems, this means that all stores to the variable are one of a possible two memory accesses in the instruction. In that case, the merge will save one cycle in the execution of the program because, if the variable were replicated, one extra cycle for another memory access would be necessary. Similarly, the cost of a merge is +1 for all other cases. Also, the cost of a merge may be set to infinite if the resulting graph after that merge is no longer 2-colorable, for two memory banks, or N-colorable for N memory banks.

Figure 14:
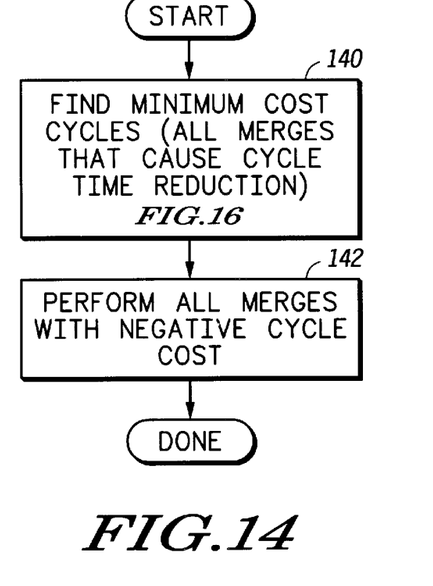
FIG. 14 is a flow chart illustrating a method of cost based merging vertices of a line graph.

FIG. 14 is a flow chart illustrating a method of cost based merging vertices of a line graph. The method starts by finding minimum cost cycles for L(G'), step 140. These are all the merges that cause a cycle time reduction. Finally, all merges that have a negative cycle cost are performed, step 142.

Figure 15:
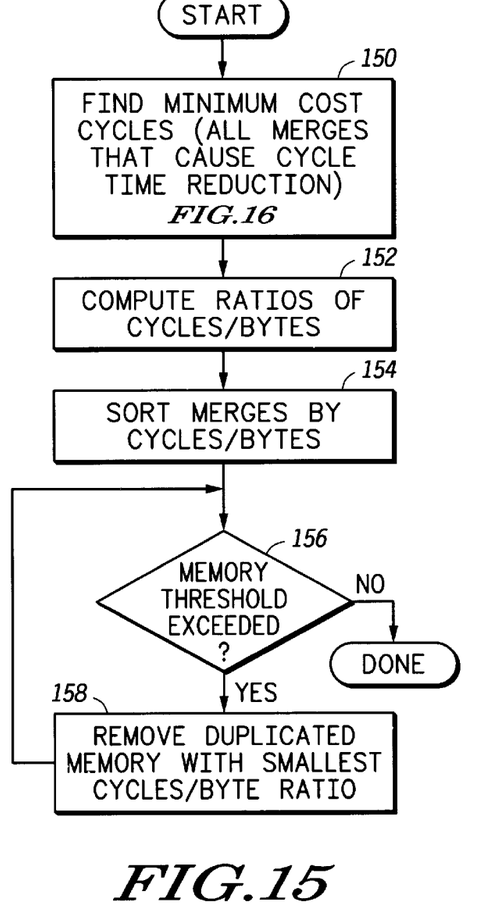
FIG. 15 is a flow chart illustrating a method of cost based merging vertices of a line graph subject to a maximum memory size constraint.

FIG. 15 is a flowchart illustrating a method of cost based merging vertices of a line graph subject to a maximum memory size constraint. The method starts by finding minimum cost cycles for L(G'), step 140. These are all the merges that cause a cycle time reduction. Then, a cycles/bytes ratio is computed for each potential merge, step 152. The potential merges are then sorted by their cycles/bytes ratios, step 154. A "while" loop is then entered that starts by testing whether a memory threshold has been exceeded, step 156. As long as the memory threshold is not being exceeded, step 156, the potential merge with the smallest cycles/bytes ratio is removed, step 158, and the loop repeats starting with the test at step 156. Otherwise, the method is complete.

Figure 16:
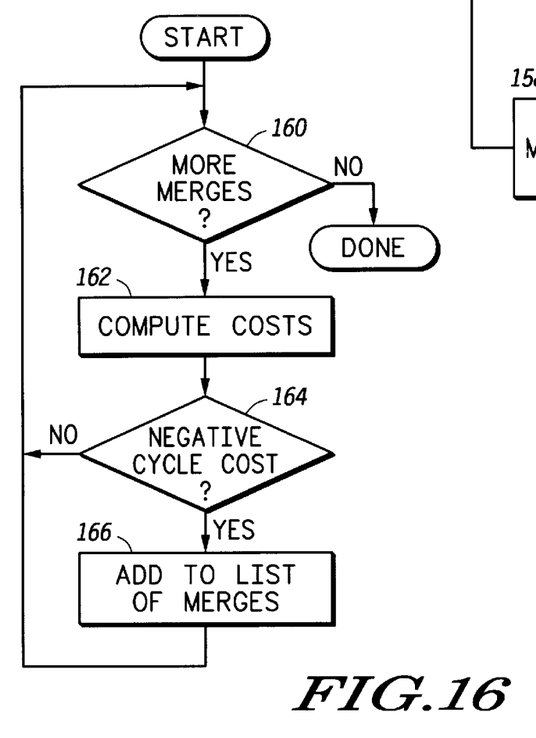
FIG. 16 is a flow chart illustrating a method of finding a list of merges that cause cycle time reduction as referenced in FIGS. 14 and 15.

FIG. 16 is a flow chart illustrating a method of finding a list of merges that cause cycle time reduction as referenced in box 140 of FIG. 14 and box 150 of FIG. 15. A "while" loop is entered and a check is made for more potential merges, step 160. As long as there are more potential merges, step 160, the loop is executed the next potential merge. Memory and cycle costs are computed for the current potential merge, step 162. Then, a test is made whether the cycle cost is negative, step 164. If the cycle cost is negative, step 164, indicating a potentially beneficial program speedup, the potential merge is added to a list of potential merges, step 166. In either case, regardless of whether the cycle cost is negative, step 164, the loop repeats, starting with the test for more potential merges, step 160. When no more potential merges are found, step 160, the routine is done.

One way to prioritize the order in which merges are performed is to incorporate execution profile information. Edges are weighted by the execution count of the instruction generating the edge. In the absence of profile information, one may prioritize concurrent-access inside loops. In this case edges generated by instructions inside loops are weighted with the loop nesting depth. The algorithm is first applied only considering edges with the highest weight, then successively proceeding to edges of lower weight. It is possible to consider ignoring edges whose weight is below a given threshold. This allows for an algorithmic tradeoff between performance and cost (in memory size) due to data replication.

Figure 17:
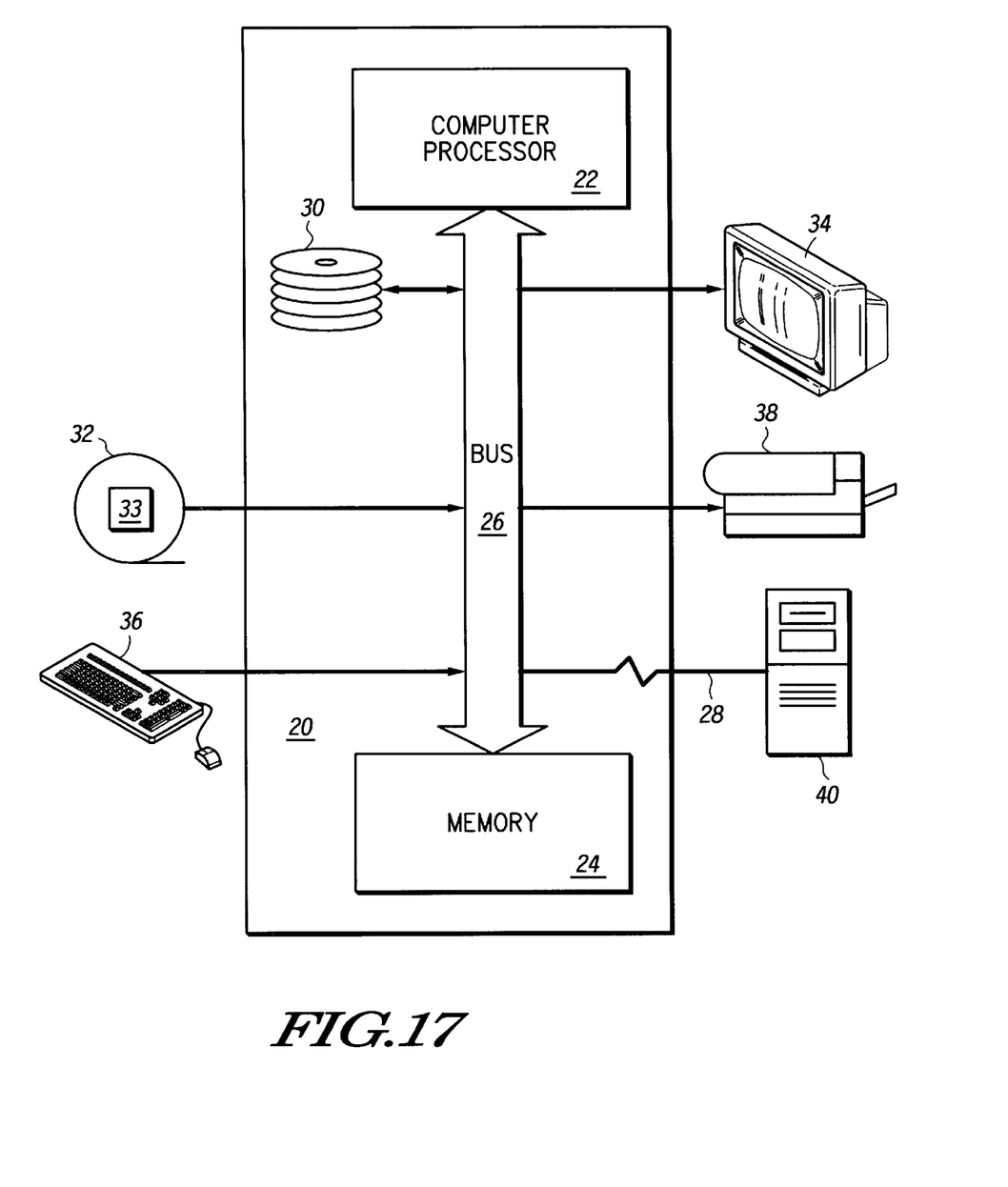
FIG. 17 is a block diagram illustrating a General Purpose Computer.

FIG. 17 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine readable media such as hard disk drives, magnetic drum, and bubble memory. External Storage 32 includes machine readable media such as floppy disks, removable hard drives, magnetic tape, CD-ROM, and even other computers, possibly connected via a communications line. The distinction drawn here between Secondary Storage 30 and External Storage 32 is primarily for convenience in describing the invention. As such, it should be appreciated that there is substantial functional overlap between these elements. Computer software such as compilers that utilize this invention, compiled code generated by such compiler, and other user programs can be stored in a Computer Software Storage Medium, such as memory 24, Secondary Storage 30, and External Storage 32. Executable versions of computer software 33, including such compilers and their generated code, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of allocating data over a plurality of memories for concurrent access, said method comprising the steps of:
    A) transforming a line graph into a transformed graph to remove edges corresponding to definitions reaching multiple uses and edges corresponding to uses reached by multiple definitions;
    B) selectively merging vertices of the transformed graph to form a merged graph, wherein the merged graph is a tri-partite graph;
    C) allocating data to the plurality of memories utilizing the merged graph; and
    D) applying graph coloring to the merged graph to form a final graph.

2. The method in claim 1 which further comprises:
    E) converting a concurrent access graph into a line graph corresponding to the concurrent access graph.

3. The method in claim 2 which further comprises:
    F) building a concurrent access graph of data variables in a program.

4. The method in claim 1 wherein:
    step (B) comprises:
        1) finding a minimum cost cycle for each of a set of all merge candidates;
        2) computing a ratio of cycles/bytes for each the set of all merge candidates,
        3) sorting merge candidates by the ratio of cycles/bytes,
        4) testing whether a memory threshold has been exceeded;
        5) removing a duplicated memory reference with a smallest cycles/bytes ratio; and
        6) repeating substeps (4) and (5) as a loop as long as the memory threshold tested in substep (4) is exceeded.

5. The method in claim 1 wherein:
    step (B) comprises:
        1) testing for more merges to check;
        2) if there are more merges to check, selecting a selected merge;
        3) computing a memory cost for the selected merge;
        4) computing a cycle cost utilizing the memory cost;
        5) testing for the cycle cost being negative; and
        6) repeating substeps (1), (2), (3), (4), (5), and (6) as a loop until there are no more merges to check.

6. The method in claim 1 wherein:
    the plurality of memories are dual data memory banks of random access memory (RAM).

7. The method in claim 6 wherein:
    the dual data memory banks of random access memory (RAM) are coupled to and utilized by a Digital Signal Processor (DSP).

8. The method in claim 1 wherein:
    the plurality of memories are register files for use by a central processing unit (CPU).

9. The method in claim 1 wherein:
    step (C) comprises:
        applying graph coloring to the merged graph to form a final graph; said method further comprises:
            E) converting a concurrent access graph into a line graph corresponding to the concurrent access graph;
            F) building a concurrent access graph of data variables in a program; and
            G) generating an object code version of the program that allocates data over the plurality of memories.

10. The method in claim 9 wherein:
    step (B) comprises:
        1) finding a minimum cost cycle for each of a set of all merge candidates;
        2) computing a ratio of cycles/bytes for each of the set of all merge candidates,
        3) sorting each of the set of all merge candidates by the ratio of cycles/bytes,
        4) testing whether a memory threshold has been exceeded;
        5) removing a duplicated memory reference with a smallest cycles/bytes ratio; and
        6) repeating substeps (4) and (5) as a loop as long as the memory threshold tested in substep (4) is exceeded.

11. The method in claim 9 wherein:
    step (B) comprises:
        1) testing for more merges to check;
        2) if there are more merges to check, selecting a selected merge;
        3) computing a memory cost for the selected merge;
        4) computing a cycle cost utilizing the memory cost;
        5) testing for the cycle cost being negative; and
        6) repeating substeps (1), (2), (3), (4), (5), and (6) as a loop until there are no more merges to check.

12. A compiler executable on a central processing unit (CPU) and stored in a Computer Software Storage Medium that allocates data over a plurality of memories for concurrent access, said compiler comprising:
    A) a set of computer instructions stored in a computer software storage medium for transforming a line graph into a transformed graph to remove edges corresponding to definitions reaching multiple uses and edges corresponding to uses reached by multiple definitions;
    B) a set of computer instructions stored in the computer software storage medium for selectively merging vertices of the transformed graph to form a merged graph; and
    C) a set of computer instructions stored in the computer software storage medium for allocating data to the plurality of memories utilizing the merged graph;
    D) wherein a computer program generated by the compiler is stored on a non-volatile storage medium encoded in a machine readable format.

13. The compiler in claim 12 wherein:
    said set of computer instructions (C) comprises:
        a set of computer instructions for applying graph coloring to the merged graph to form a final graph.

14. The compiler in claim 12 which further comprises:
    E) a set of computer instructions stored in the Computer Software Storage Medium for converting a concurrent access graph into a line graph corresponding to the concurrent access graph.

15. The compiler in claim 14 which further comprises:
F) a set of computer instructions stored in the Computer Software Storage Medium for building a concurrent access graph of data variables in a program.

16. The compiler in claim 12 wherein:
said set of computer instructions (B) comprises:
1) a set of computer instructions for finding minimum cost cycles for each of a set of all merge candidates; and
2) a set of computer instructions for performing all merges with a negative cycle cost.

17. The compiler in claim 12 wherein:
said set of computer instructions (B) comprises:
1) a set of computer instructions for finding a minimum cost cycle for each of a set of all merge candidates;
2) a set of computer instructions for computing a ratio of cycles/bytes for each the set of all merge candidates,
3) a set of computer instructions for sorting merge candidates by the ratio of cycles/bytes,
4) a set of computer instructions for testing whether a memory threshold has been exceeded;
5) a set of computer instructions for removing a duplicated memory reference with a smallest cycles/bytes ratio; and
6) a set of computer instructions for repeating sets of computer instructions (4) and (5) as a loop as long as the memory threshold tested in set of computer instructions (4) is exceeded.

18. The compiler in claim 12 wherein:
said set of computer instructions (B) comprises:
1) a set of computer instructions for testing for more merges to check;
2) if there are more merges to check, a set of computer instructions for selecting a selected merge;
3) a set of computer instructions for computing a memory cost for the selected merge;
4) a set of computer instructions for computing a cycle cost utilizing the memory cost;
5) a set of computer instructions for testing for the cycle cost being negative; and
6) a set of computer instructions for repeating sets of computer instructions (1), (2), (3), (4), (5), and (6) as a loop until there are no more merges to check.

19. The compiler in claim 12 stored on a Non-Volatile Storage Medium encoded in a machine readable format.

20. A system for allocating data over a plurality of memories for concurrent access, said system comprising:
A) means for transforming a line graph into a transformed graph to remove edges corresponding to definitions reaching multiple uses and edges corresponding to uses reached by multiple definitions, at least one of the line graph and the transformed graph stored in a volatile memory;
B) means for selectively merging vertices of the transformed graph to form a merged graph; and
C) means for allocating data to the plurality of memories utilizing the merged graph.

21. A method of allocating data over a plurality of memories for concurrent access, said method comprising the steps of:
A) transforming a line graph into a transformed graph to remove edges corresponding to definitions reaching multiple uses and edges corresponding to uses reached by multiple definitions;
B) selectively merging vertices of the transformed graph to form a merged graph;
C) allocating data to the plurality of memories utilizing the merged graph; and
D) applying clique partitioning to the merged graph to form a final graph.

22. A method of allocating data over a plurality of memories for concurrent access, said method comprising the steps of:
A) transforming a line graph into a transformed graph to remove edges corresponding to definitions reaching multiple uses and edges corresponding to uses reached by multiple definitions;
B) selectively merging vertices of the transformed graph by selecting merging candidates based on cycle cost criteria to form a merged graph; and
C) allocating data to the plurality of memories utilizing the merged graph.

23. The method in claim 22 wherein:
the cycle cost criteria includes a ratio of cycles/bytes memory costs subject to a memory size limitation.

24. A method of allocating data over a plurality of memories for concurrent access, said method comprising the steps of:
transforming a line graph into a transformed graph to remove edges corresponding to definitions reaching multiple uses and edges corresponding to uses reached by multiple definitions;
selectively merging vertices of the transformed graph by selecting merging candidates based on execution profiling information to form a merged graph; and
allocating data to the plurality of memories utilizing the merged graph.

25. The method in claim 24, further comprising:
finding minimum cost cycles for each of a set of the merging candidates; and
performing merges having a negative cycle cost.

26. A method of allocating data over a plurality of memories for concurrent access, said method comprising the steps of:
transforming a line graph into a transformed graph to remove edges corresponding to definitions reaching multiple uses and edges corresponding to uses reached by multiple definitions, at least one of the line graph and the transformed graph stored in a volatile memory;
selectively merging vertices of the transformed graph to form a merged graph; and
allocating data to the plurality of memories utilizing the merged graph.

27. A processor comprising:
a plurality of memories; and
data allocated over the plurality of memories for concurrent access using a merged graph, the merged graph formed by selectively merging vertices of a transformed graph derived from a line graph by removing edges corresponding to definitions reaching multiple uses and edges corresponding to uses reached by multiple definitions, wherein at least one of the line graph and the transformed graph are stored in a volatile memory.

28. The processor of claim 27 further comprising a central processing unit coupled to the plurality of memories.

29. The processor of claim 28, wherein the central processing unit and the plurality of memories form at least a portion of a digital signal processor.

30. The processor of claim 27, wherein the plurality of memories comprise a register file.

* * * * *